United States Patent
Eltabakh et al.

(10) Patent No.: US 11,782,925 B2
(45) Date of Patent: Oct. 10, 2023

(54) SELECTIVITY COMPUTATION FOR FILTERING BASED ON METADATA

(71) Applicant: TERADATA US, INC., San Diego, CA (US)

(72) Inventors: Mohamed Ahmed Yassin Eltabakh, Worcester, MA (US); Eugene Szedenits, Jr., Ypsilanti, MI (US); Chengzhu Zhang, Torrance, CA (US); Mohammed Al-Kateb, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 97 days.

(21) Appl. No.: 17/131,941

(22) Filed: Dec. 23, 2020

(65) Prior Publication Data

US 2022/0197908 A1  Jun. 23, 2022

(51) Int. Cl.
*G06F 16/2453* (2019.01)
*G06F 16/22* (2019.01)

(52) U.S. Cl.
CPC .... *G06F 16/24545* (2019.01); *G06F 16/2228* (2019.01)

(58) Field of Classification Search
CPC ............... G06F 16/24545; G06F 16/2228
See application file for complete search history.

(56) References Cited

U.S. PATENT DOCUMENTS

| | | | |
|---|---|---|---|
| 2007/0050328 A1* | 3/2007 | Li | G06F 16/9032 |
| 2011/0075227 A1* | 3/2011 | Watanabe | H04N 1/2032 358/474 |
| 2012/0072413 A1* | 3/2012 | Castellanos | G06F 16/217 707/718 |
| 2013/0290249 A1* | 10/2013 | Merriman | G06F 16/278 707/610 |
| 2016/0098451 A1* | 4/2016 | Dickie | G06F 16/2465 707/714 |
| 2017/0212936 A1* | 7/2017 | Kalarikal Janardhana | G06F 16/245 |
| 2018/0137171 A1* | 5/2018 | Hill | G06F 16/24545 |

* cited by examiner

*Primary Examiner* — Allen S Lin
(74) *Attorney, Agent, or Firm* — Trop Pruner & Hu P.C.

(57) ABSTRACT

In some examples, the database system maintains metadata for a plurality of data objects, the metadata containing ranges of values of an attribute for the plurality of data objects, where the ranges of values of the attribute comprise a respective range of values of the attribute for each corresponding data object of the plurality of data objects. The database system generates a data structure tracking quantities of ranges of values of the attribute that have a specified relationship with respect to corresponding different values of the attribute. The database system receives a database query comprising a predicate specifying a condition on a given value of the attribute, and computes, for the database query, a selectivity of filtering based on the metadata, the selectivity computed based on the data structure.

17 Claims, 4 Drawing Sheets

SELECTIVITY COMPUTATION FOR FILTERING BASED ON METADATA

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

BRIEF DESCRIPTION OF THE DRAWINGS

Some implementations of the present disclosure are described with respect to the following figures.

Figure 1:
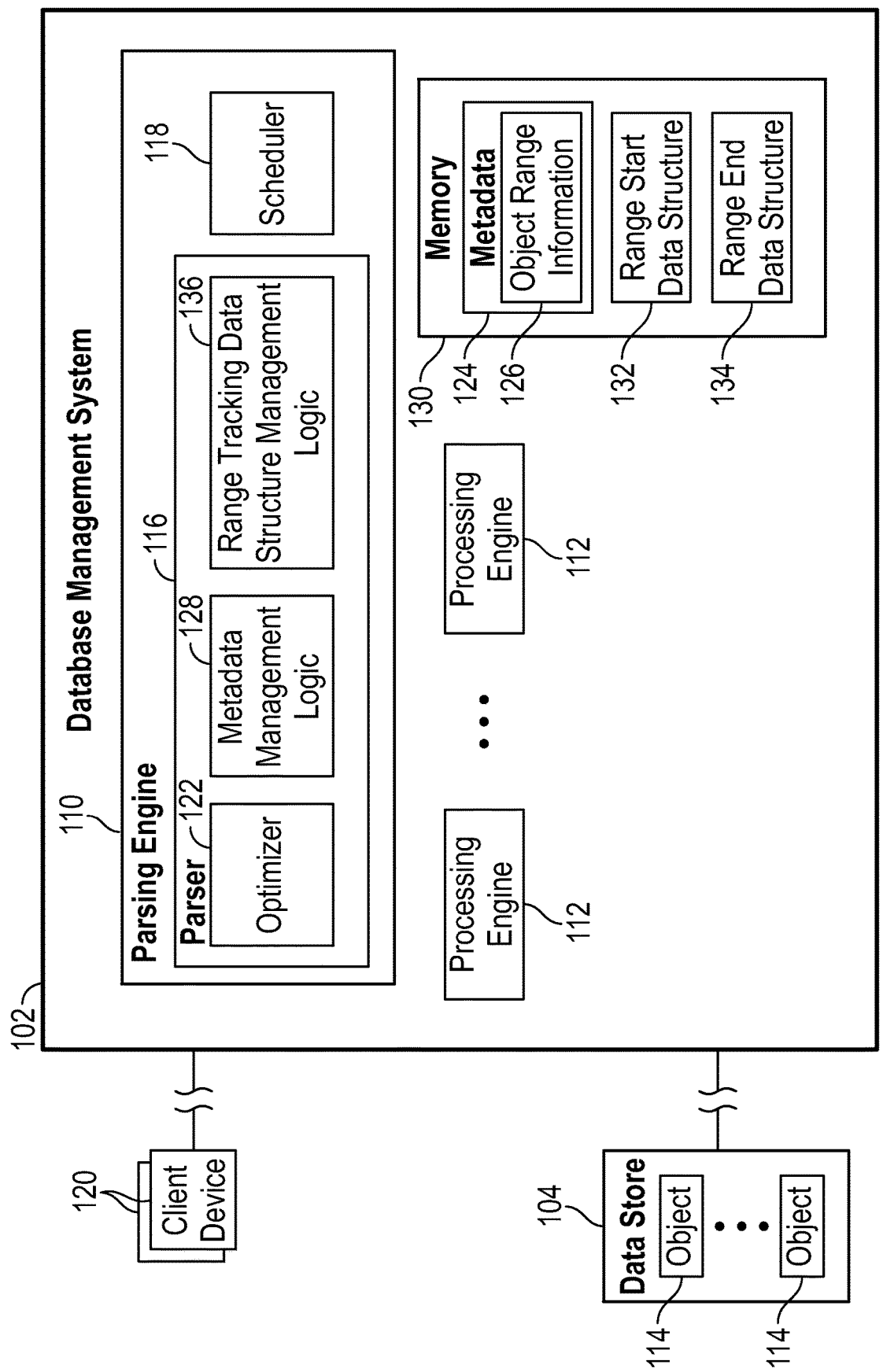
FIG. 1 is a block diagram of an example arrangement that includes a database management system and a data store, according to some implementations of the present disclosure

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a data store 104. In some examples, the data store 104 is an object store that stores objects 114. The objects 114 can include any container of data, such as files, disk blocks, partitions, extents, relational tables, and so forth. As further examples, an object can include a collection of rows or a collection of columns of relational tables.

In some examples, the data store 104 is in a local storage of the DBMS 102. A local storage can refer to a storage implemented with one or more storage devices that are coupled over a high-speed interconnect to the DBMS 102. In other examples, the data store 104 is a remote data store that is remotely accessible by the DBMS 102 over a network. A network over which a remote data store is accessible can include a public network (e.g., the Internet), a local area network (LAN), a wide area network (WAN), a wireless network (e.g., a wireless local area the network or WLAN, a cellular network, etc.), or any other type of network. For example, the remote data store can be accessible in a cloud, which can refer to any infrastructure, including computing, storage, and communication resources, that can be accessed remotely by devices over a network. Alternatively, the remote data store can be provided in a data center or in any other computing environment.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., different objects 114, different portions of objects 114) of the data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

The parsing engine 110 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 120, which may be coupled to the DBMS 102 over an interconnect (e.g., a network or another link). The parser 116 parses each received database query, and generates executable steps for the parsed query. The parser 116 includes an optimizer 122 that generates multiple query plans in response to a query. The optimizer 122 selects the most efficient query plan from among the multiple query plans.

In some examples, the optimizer 122 performs cost-based query optimization. Cost estimation can be based on various factors, including a quantity of rows (cardinality) of tables involved in a database operation specified by the query, statistics on attributes (or columns) of tables, access paths to the data (which can be associated with communication latency and usage of resources such as processing resources and storage resources), and/or other factors. The optimizer 122 can compute costs for the various query plans, and the optimizer 122 can select the query plan with the lowest cost.

Each query plan includes a sequence of executable steps to perform to process the database query. The scheduler 118 sends the executable steps of the selected query plan to respective processing engines 112 to perform the executable steps.

Each processing engine 112 manages access (read or write) of data in respective objects 114 in the data store 104. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

The DBMS 102 also maintains metadata 124 for the objects 114 stored in the data store 104. The metadata 124 can include information of various characteristics of the objects 114. In some examples, the metadata 124 includes information specifying a range of attribute values (depicted as object range information 126 in FIG. 1). In examples where an object 114 includes data records (e.g., rows) of a relational table, an attribute can refer to a column of the relational table. For each respective object 114, the object range information 126 can include a minimum attribute value (of the attribute) and a maximum attribute value (of the attribute), where the minimum attribute value and the maximum attribute defines a range of the attribute in the respective object 114. This range can also be referred to as a min-max range of values of the attribute contained in the object 114.

The object range information 126 can identify a first min-max range for a first object 114, a second min-max range for a second object 114, and so forth. Each min-max range is identified based on a pair of a minimum attribute value and a maximum value for the respective object 114.

In addition to the object range information 126, the metadata 124 can also include other information relating to the objects 114.

The metadata 124 can be stored in a memory 130, which can be implemented using one or more memory devices. In some examples, the memory 130 includes a nonvolatile memory, which can be implemented using one or more flash memory devices or other types of nonvolatile memory devices. In further examples, the memory 130 can further include a volatile memory, such as a dynamic random access memory (DRAM) or a static random access memory (SRAM), as examples.

In examples according to FIG. 1, parser 116 further includes a metadata management logic 128 to maintain the metadata 124 stored in the memory 130.

As used here, "logic" that is part of an "engine" can refer to a portion of the hardware processing circuit of the engine, or to machine-readable instructions executed by the engine.

As data in a given object 114 is modified (e.g., due to insertion of a data record, deletion of a data record, or an update of a data record), the metadata management logic 128 can modify the metadata 124 for the given object 114 if appropriate. For example, if the modification of the data of the given object 114 results in a change in the min-max range of attribute values, then the object range information 126 for the given object 114 can be changed, such as by updating either the minimum attribute value or the maximum attribute value specifying the min-max range for the given object 114.

The parser 116 also includes a range tracking data structure management logic 136 that is able to produce a range start data structure 132 and a range end data structure 134. The range start data structure 132 tracks quantities of min-max ranges of an attribute that start before respective minimum values of the attribute, where the minimum values are the minimum values specifying the starts of corresponding min-max ranges. Similarly, the range end data structure 134 tracks the quantities of min-max ranges of the attribute that end before respective different maximum values, where the maximum values are the maximum values of the min-max ranges. The range start data structure 132 and the range end data structure 134 are explained in detail further below.

Although FIG. 1 shows the metadata management logic 128 and the range tracking data structure management logic 136 being part of the parser 116, in other examples, the metadata management logic 128 and/or the range tracking data structure management logic 136 may be separate from the parser 116.

In some examples, in response to a database query, the DBMS 102 can perform filtering of objects 114 based on the metadata 124 including the object range information 126. The database query contains a predicate that specifies a condition on an attribute. Note that a predicate can specify a condition on multiple attributes, but for the sake of simplicity, the present discussion focuses on examples in which a predicate specifies a condition on an attribute.

Based on the predicate of the database query, the DBMS 102 can apply filtering of the objects 114 to determine which of the objects 114 would not be relevant for the database query. For example, if the predicate specifies that data records satisfying the database query contains values of an attribute that are within a specified range (e.g., an attribute is greater than a first value but less than a second value), then the DBMS 102 can apply filtering based on the object range information 126 to filter out (remove from consideration when processing the database query) any objects 114 associated with min-max ranges that are outside the specified range as specified in the predicate of the database query.

In some examples, DBMSs may attempt to aggressively apply metadata filtering when processing database queries, without considering the selectivity power of the metadata filtering. The selectivity of the metadata filtering indicates a quantity of the objects 114 that will qualify based on the metadata 124 and the predicate of a database query. The metadata filtering has a lower selectivity if a larger percentage of objects 114 will not be filtered out based on the metadata filtering. The metadata filtering has a higher selectivity if a larger quantity of objects 114 will be filtered out by the metadata filtering.

Applying metadata filtering without considering the selectivity of the metadata filtering can result in wasting processing resources of the DBMS 102. For example, if the metadata 124 for each object 114 in the data store 104 is to be processed and checked for each database query, the processing burden in the DBMS 102 can add up, especially if there are a large number of objects 114 that may be involved in a database operation specified by a database query. For example, a database query that specifies a join of multiple tables may involve a large number of objects if the tables are large and the data records for such tables are stored in a large number of objects 114.

If the metadata filtering selectivity is low (which means that few objects 114 may be filtered out), then the application of metadata filtering may consume processing resources while not significantly reducing the amount of data that has to be processed for the database query. In such an example, it may not be desirable in some cases to apply metadata filtering before performing other tasks of the database operation specified by the database query.

If the selectivity of metadata filtering is not considered, a query plan that is selected by the optimizer 122 for a database query may be sub-optimal.

For example, consider the following database query:
SELECT*FROM t1, t2 WHERE t1.Y=t2.Y AND t1.Z=100;

This database query specifies a join of tables t1 and t2 based on the predicate t1.Y=t2.Y AND t1.Z=100 (Y is an attribute of tables t1 and t2, and Z is an attribute of table t1). Also assume that the object range information 126 of the metadata 124 identifies min-max ranges for the t1.Z attribute. Assume further that the DBMS 102 maintains an index on the t1.Y attribute. The index allows the DBMS 102 to find rows of table t1 containing respective values of the t1.Y attribute without having to search the entire table t1.

For the above example database query, the optimizer 122 may consider multiple potential query plans to decide which query plan to choose for processing the database query. A first query plan may include first performing the metadata filtering before the join, and a second query plan may include first performing the join before performing the metadata filtering. The join can use the index on the t1.Y attribute, which may help speed up access of relevant rows of the table t1 for the join.

In accordance with some implementations of the present disclosure, the optimizer 122 considers the selectivity of metadata filtering in deciding which query plan, from among the multiple query plans, to select for the example database query. The selectivity of metadata filtering can be computed using range tracking data structures, including the range start data structure 132 and the range end data structure 134, as discussed further below.

If the selectivity of the metadata filtering is low, then the optimizer can choose the second query plan that performs the join before performing the metadata filtering. Low metadata filtering selectivity means that fewer objects 114 will be filtered out, so that it may be more efficient to first perform the join (in which the join predicate is applied) to produce a join result (which is likely to include a smaller amount of data than in tables t1 and t2). The metadata filtering can then be applied on objects 114 containing the data of the join result. There may be fewer objects 114 containing the data of the join result than the objects 114 containing the data of tables t1 and t2.

On the other hand, if the selectivity of the metadata filtering is high, then the optimizer can choose the first query plan that performs the metadata filtering before the join. High metadata filtering selectivity means that a larger quantity of objects 114 will be filtered out, which makes the join more efficient since the predicate of the database query is applied on a smaller amount of data.

Figure 2:
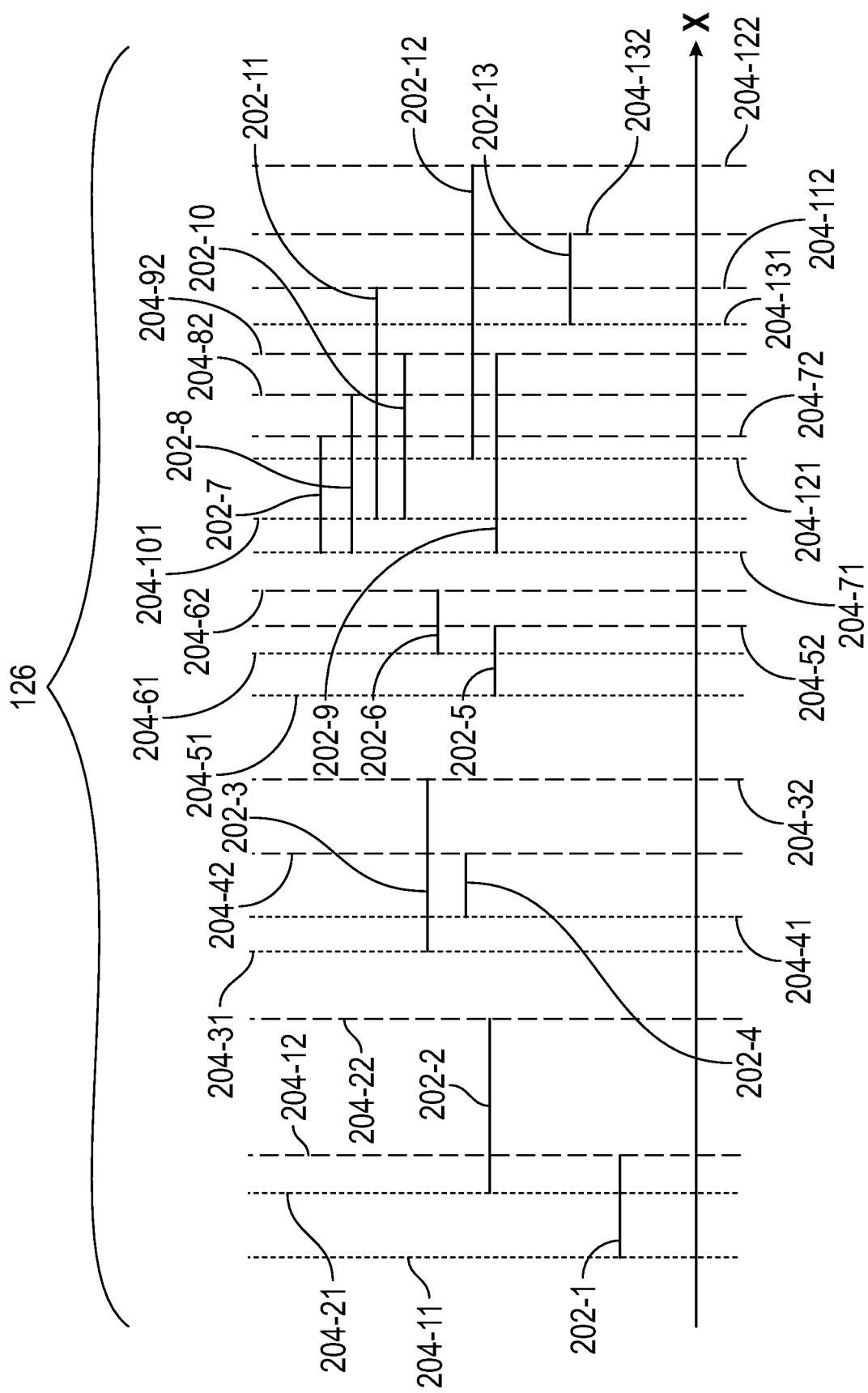
FIG. 2 is a schematic diagram of metadata containing ranges of values of an attribute for corresponding objects stored in the data store, according to some examples of the present disclosure.

FIG. 2 is a graphical representation of the object range information 126 for corresponding objects 114. In the example of FIG. 1, the object range information 126 represents min-max ranges of an attribute X. Although FIG. 2 provides a graphical representation of the object arrange information 126, it is noted that the object range information 126 can be stored as a different data structure in the memory 130 of the DBMS 102. For example, a data structure of the object range information 126 can be in the form of mapping information that correlates names of objects to respective min-max ranges (identified by a pair of a minimum attribute value of X and a maximum attribute value of X).

In the example of FIG. 2, horizontal line segments represent respective min-max ranges 202-1 to 202-13 for respective objects 1 to 13. Each min-max range 202-*i* (i=1 to 13) is for a corresponding object i; i.e., the min-max range 202-*i* indicates the range of values of X that are present in the object i.

Each min-max range 202-*i* starts at a minimum X value (represented by a vertical small-dotted line) and ends at a maximum X value (represented by a vertical large-dotted line). For example, the min-max range 202-1 starts at a minimum X value 204-11, and ends at a maximum X value 204-12. Similarly; the min-max range 202-2 starts at a minimum X value 204-21, and ends at a maximum X value 204-22; the min-max range 202-3 starts at a minimum X value 204-31, and ends at a maximum X value 204-32; the min-max range 202-4 starts at a minimum X value 204-41, and ends at a maximum X value 204-42; the min-max range 202-5 starts at a minimum X value 204-51, and ends at a maximum X value 204-52; the min-max range 202-6 starts at a minimum X value 204-61, and ends at a maximum X value 204-62; the min-max range 202-7 starts at a minimum X value 202-71 and ends at a maximum value 202-72; the min-max range 202-8 starts at the minimum X value 204-71 (same starting value as the min-max range 202-7), and ends at a maximum X value 204-82; the min-max range 202-9 starts at the minimum X value 204-71 (same starting value as the min-max range 202-7), and ends at a maximum X value 204-92; the min-max range 202-10 starts at a minimum X value 204-101, and ends at a maximum X value 204-92 (the same ending value as the min-max range 202-9); the min-max range 202-11 starts at the minimum X value 204-101 (same starting value as the min-max range 202-10), and ends at a maximum X value 204-112; the min-max range 202-12 starts at a minimum X value 204-121, and ends at a maximum X value 204-122; and the min-max range 202-13 starts at a minimum X value 204-131, and ends at a maximum X value 204-132.

Note that it is possible for multiple min-max ranges to start at the same minimum X value, such as min-max ranges 202-7, 202-8, and 202-9, which all start at the same minimum X value 202-71. It is also possible for multiple min-max ranges to end at the same maximum value, such as min-max ranges 202-9 and 202-10, which both end at the same maximum X value 202-92.

Figure 3:
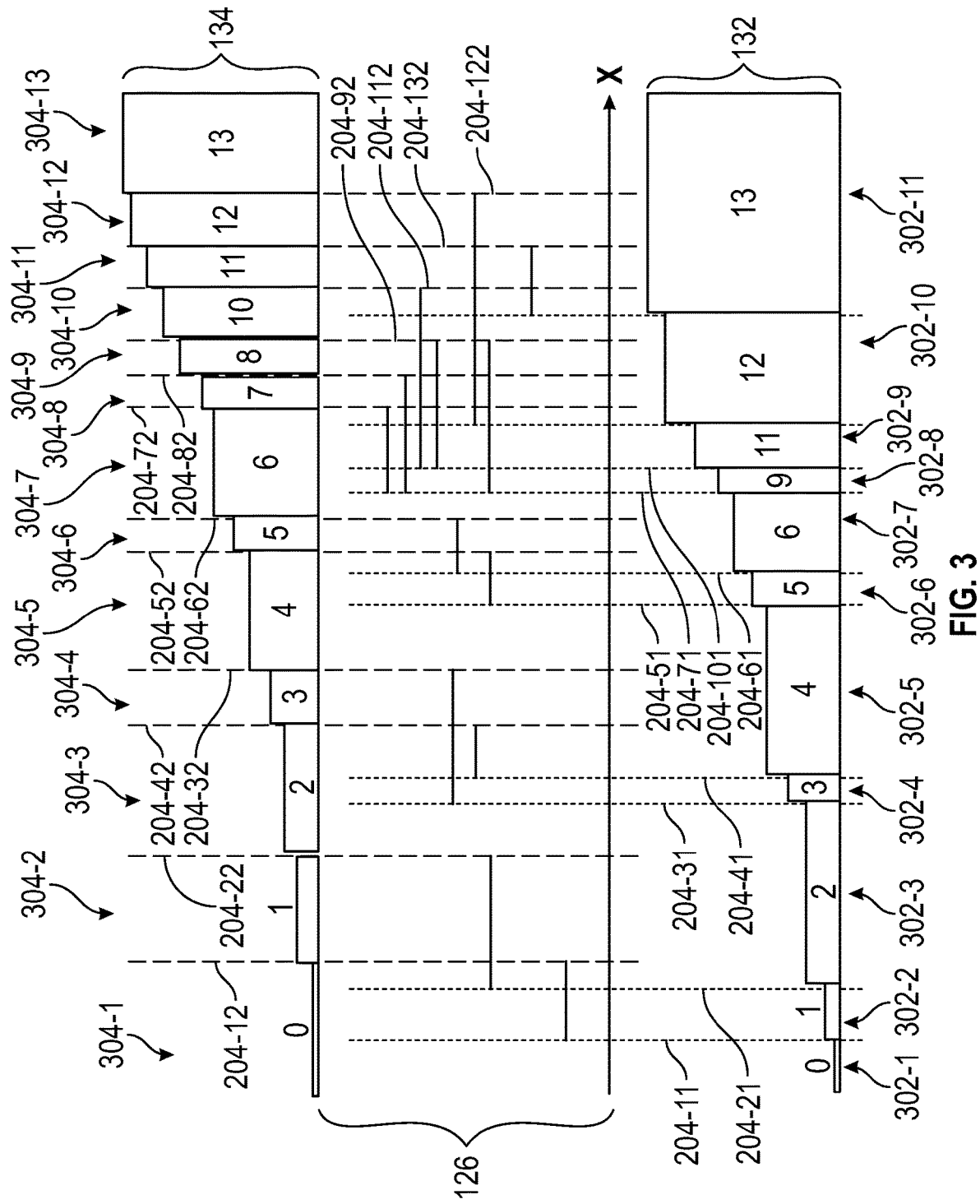
FIG. 3 is a schematic diagram of histograms generated based on the ranges of values of the attribute, according to some examples of the present disclosure.

FIG. 3 graphically shows examples of the range start data structure 132 and the range end data structure 134 generated based on the object range information 126. FIG. 3 graphically depicts the range start data structure 132 and the range end data structure 134. Note that the range start data structure 132 and the range end data structure 134 can be stored in the memory 130 in a different format, such as in the form of respective arrays or another format.

In the example of FIG. 3, each of the range start data structure 132 and the range end data structure 134 is in the form of a histogram, including multiple buckets and a quantity value in each bucket.

For example, the range start data structure 132 includes buckets 302-1 to 302-11 (11 buckets). A quantity value in each bucket 302-*j* (j=1 to 11) represents a quantity of min-max ranges that start before a respective minimum value of the attribute X. For example, the quantity value in the bucket 302-1 is 0, which indicates that there are zero min-max ranges that start before the minimum X value 204-11, which is the starting X value of the min-max range 202-1 for object 1.

The quantity value for the bucket 302-2 is 1, which indicates that there is one min-max range that starts before the respective minimum X value 204-21, which is the starting X value for the min-max range 202-2 for object 2.

The quantity value in the bucket 302-8 is 9, which indicates that nine min-max ranges start before the respective minimum X value 204-101. The nine min-max ranges that start before the minimum X value 204-101 are 202-1, 202-2, 202-3, 202-4, 202-5, 202-6, 202-7, 202-8, and 202-9.

The range end data structure 134 includes 13 buckets 304-1 to 304-13. Each quantity value in a respective bucket 304-$k$ ($k$=1 to 13) represents the quantity of min-max ranges that end before the respective maximum X value. For example, the quantity value in the bucket 304-1 is 0, which indicates that there are zero min-max ranges that end before the maximum X value 204-12, which is the ending X value of the min-max range at 202-1. The quantity value in the bucket 304-2 is 1, which indicates that there is one min-max range that ends before the maximum X value 204-22, which is the ending X value of the min-max range at 202-2. The quantity value in the bucket 304-10 is 10, which indicates that there are ten min-max ranges that end before the maximum X value 204-112, which is the ending X value of the min-max range at 202-11.

In some examples, the range tracking data structure management logic 136 can apply a sweep-line algorithm that scans the object range information 126 (graphically represented in FIG. 2) from left to right (in the view of FIG. 2), which is from a lowest value to a highest value. The sweep-line algorithm is used by the range tracking data structure management logic 136 to generate the range start data structure 132 and the range end data structure 134.

Note that the range tracking data structure management logic 136 can build the range start data structure 132 and the range end data structure 134 in the same run, e.g., same run of the sweep-line algorithm.

The sweep-line algorithm can use a first counter that counts a quantity of min-max ranges that start before a respective minimum attribute value. This first counter is referred to as a counter Started-Range(j) that is used to set the quantity value for a respective bucket 302-$j$. In sweeping from left to right (or from a lowest value to a highest value), the counter Started-Range(j) counter for the bucket 302-$j$ is initialized to zero, and increments when the sweep passes the beginning of each min-max range is less than the respective minimum attribute value of the bucket 302-$j$.

The sweep-line algorithm can use a second counter that counts a quantity of min-max ranges that end before a respective maximum attribute value. This second counter is referred to as a counter Ended-Range(k) that is used to set the quantity value for the respective bucket 304-$k$. In sweeping from left to right (or from a lowest value to a highest value), the counter Ended-Range(k) for the bucket 304-$k$ is initialized to zero, and increments when the sweep passes the end of each min-max range that is less than the respective maximum attribute value for bucket 304-$k$.

As noted above, arrays can be used to represent the range start data structure 132 and the range end data structure 134. The arrays can be sorted arrays.

For example, the range start data structure 132 can be represented as a sorted array (e.g., Lt) storing the minimum attribute values of the min-max ranges from lowest value to highest value in sorted order. For example, the Lt(1) value in the array Lt is the minimum attribute value of a first min-max range, the Lt(2) value in the array Lt is the minimum attribute value of a second min-max range, and so forth. An index j of the Lt array represents the quantity of min-max ranges that start before the Lt(j) value.

The range end data structure 134 can be represented as a sorted array (e.g., Gt) storing the maximum attribute values of the of the min-max ranges from lowest value to highest value in sorted order. For example, the Gt(1) value in the array Gt is the maximum attribute value of a first min-max range, the Gt(2) value in the array Gt is the minimum attribute value of a second min-max range, and so forth. An index k of the Gt array represents the quantity of min-max ranges that end before the Gt(k) value.

The following describes examples for computing an estimated selectivity of metadata filtering, for a given database query. Assume that N represents the total quantity of objects 114 in the data store 104. Thus, N also represents the total quantity of min-max ranges.

The range start data structure 132 and/or the range end data structure 134 can be employed to compute the selectivity of metadata filtering for different database queries, based on the predicates in the database queries.

The following sets forth four example cases. In the ensuing, it is assumed that LtHistogram( ) includes the quantity values in respective buckets of the range start data structure 132, and GtHistogram( ) includes the quantity values in respective buckets of the range end data structure 134. If the attribute X has a value m, LtHistogram(m) returns a quantity value in a bucket 302-$j$ of the range start data structure 132 that contains m (i.e., m is within the range of X values corresponding to the bucket 302-$j$). Similarly, GtHistogram(m) returns a quantity value in a bucket 304-$k$ of the range end data structure 134 that contains m A first case involves a database query containing an equality predicate (e.g., Attribute X=c, where c is a constant value). The optimizer 122 (FIG. 1) can compute an estimated quantity of objects that satisfy the metadata filtering based on X=c as: EstimateQtyObj=(Quantity of started min-max ranges before c−Quantity of ended min-max ranges before c)=LtHistogram(c)−GtHistogram(c).

A second case involves a database query containing a less-than predicate (e.g., Attribute X<c). The optimizer 122 (FIG. 1) can compute an estimated quantity of objects that satisfy the metadata filtering based on X<c as: EstimateQtyObj=Quantity of started min-max ranges before c=LtHistogram(c).

A third case involves a database query containing a greater-than predicate (e.g., Attribute X>c). The optimizer 122 (FIG. 1) can compute an estimated quantity of objects that satisfy the metadata filtering based on X>c as: EstimateQtyObj=Total Quantity of min-max ranges−Quantity of ended min-max ranges before c=N−GtHistogram(c).

A fourth case involves a database query containing a range predicate (e.g., a<Attribute X<b). The optimizer 122 (FIG. 1) can compute an estimated quantity of objects that satisfy the metadata filtering based on a<Attribute X<b as: EstimateQtyObj=Quantity of started min-max ranges before b−Quantity of ended min-max ranges before a=LtHistogram(b)−GtHistogram(a).

The selectivity of the metadata filtering based on EstimateQtyObj for any of the foregoing cases can be computed as: EstimatedSelectivity=EstimateQtyObj/N.

The object-level selectivity can be used to derive additional estimates, such as the quantity of qualifying rows, assuming an average number of rows per object is provided.

Figure 4:
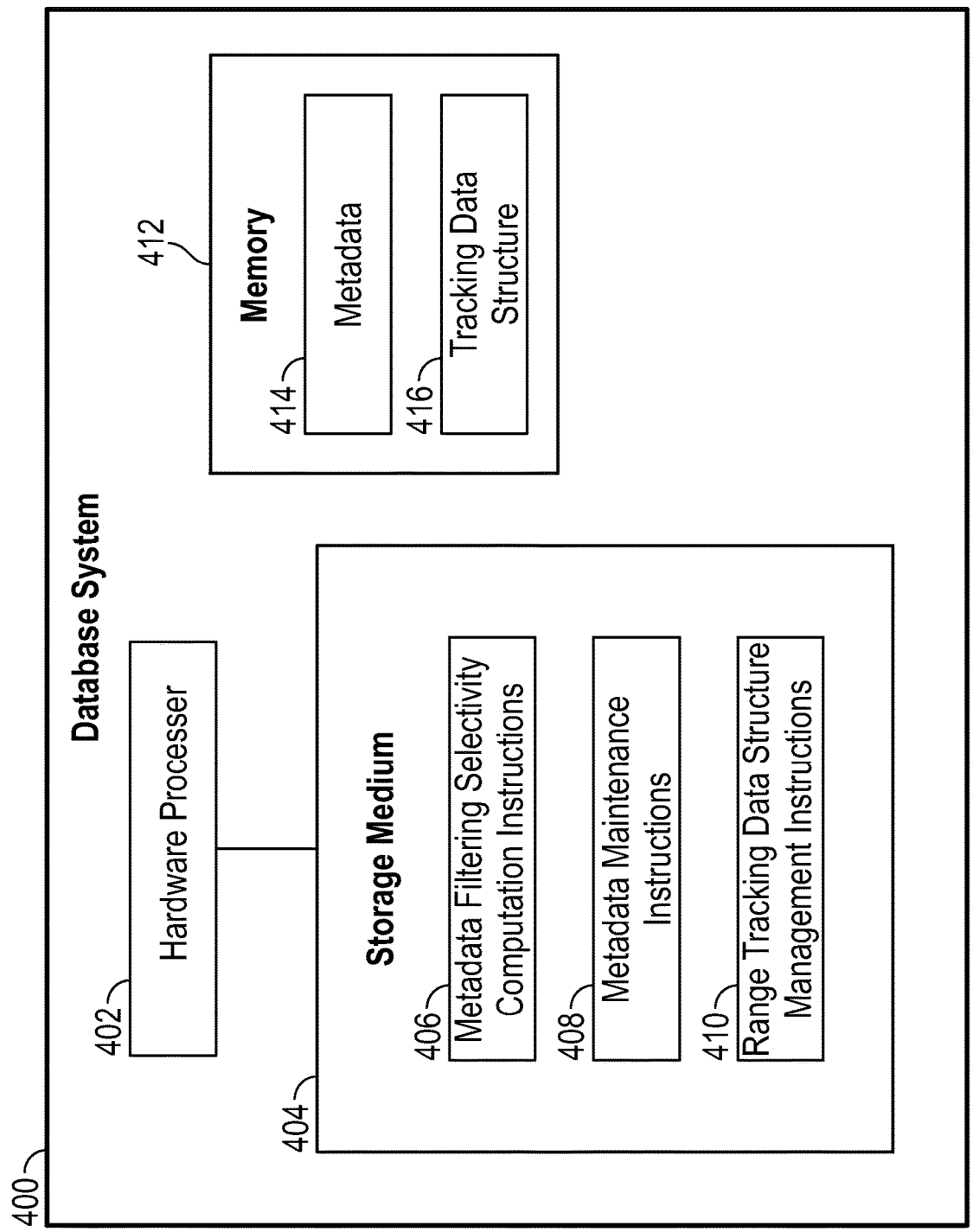
FIG. 4 is a block diagram of an example database system according to some implementations of the present disclosure.

FIG. 4 is a block diagram of a database system 400 (e.g., 102 in FIG. 1) according to some examples. The database system 400 includes one or more hardware processors 402. A hardware processor can include a microprocessor, a core of a multi-core microprocessor, a microcontroller, a programmable integrated circuit, a programmable gate array, or another hardware processing circuit.

The database system 400 includes a non-transitory machine-readable or computer-readable storage medium 404 that stores machine-readable instructions executable on the one or more hardware processors 402 to perform various tasks. The machine-readable instructions include metadata filtering selectivity computation instructions 406 to compute a selectivity of metadata filtering according to some examples of the present disclosure. The metadata filtering selectivity computation instructions 406 can be part of the optimizer 122 of FIG. 1, for example.

The machine-readable instructions include metadata maintenance instructions 408 to maintain metadata 414 (e.g., 124 in FIG. 1) for respective data objects (e.g., 114 in FIG. 1). The metadata maintenance instructions 408 may be part of the metadata management logic 128 of FIG. 1, for example. The metadata 414 contains ranges of values of an attribute for the respective data objects.

The machine-readable instructions include range tracking data structure management instructions 410 to maintain a tracking data structure 416 that tracks quantities of min-max ranges of values, such as the range start data structure 132 and/or the range end data structure 134 of FIG. 1. The range tracking data structure management instructions 410 generate the tracking data structure 416 that tracks quantities of min-max ranges of values of the attribute that have a specified relationship (start before or end before) with respect to corresponding different values of the attribute (minimum values or maximum values of the min-max ranges).

The database system 400 receives a database query including a predicate specifying a condition on a given value of the attribute, and computes, for the database query, a selectivity of filtering based on the metadata, where the selectivity is computed based on the data structure.

In response to the database query, the database system 400 can select a query plan from multiple query plans based on the computed selectivity. The multiple query plans include a first query plan in which the filtering based on the metadata is performed before a database operation (e.g., a join) specified by the database query, and a second query plan in which the database operation specified by the database query is performed before the filtering based on the metadata. In some examples, the first query plan is selected responsive to the computed selectivity exceeding a threshold, and the second query plan is selected responsive to the computed selectivity not exceeding the threshold.

In some examples, the tracking data structure 416 (e.g., the Lt array or the LtHistogram structure discussed further above) can include multiple entries respectively representing the quantities of ranges of values of the attribute that started before the corresponding different minimum values of the attribute in the min-max ranges. If a predicate of a database query specifies that the attribute is less than a given value of the attribute, then the selectivity is computed based on a quantity represented by an entry of the data structure corresponding to the given value of the attribute.

In some examples, the tracking data structure 416 (e.g., the Gt array or the GtHistogram structure discussed further above) can include multiple entries respectively representing the quantities of ranges of values of the attribute that ended before the corresponding different maximum values of the attribute in the min-max ranges. If a predicate of a database query specifies that the attribute is greater than the given value of the attribute, then the selectivity is computed based on a total quantity of the plurality of data objects and a quantity represented by an entry of the data structure corresponding to the given value of the attribute.

If a database query includes a predicate specify an equality condition or a range condition, then the selectivity is computed based on both first and second tracking data structures (e.g., 132 and 134 in FIG. 1) that track quantities of ranges of values of the attribute that start before and end after, respectively, minimum and maximum attribute values.

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
at least one processor; and
a non-transitory storage medium storing instructions executable on the at least one processor to:
maintain metadata for a plurality of data objects, the metadata containing a plurality of ranges of values of an attribute for the plurality of data objects, wherein the plurality of ranges of values of the attribute comprise a respective range of values of the attribute for each corresponding data object of the plurality of data objects;
generate a data structure tracking quantities of ranges of values of the attribute that ended before corresponding different values of the attribute, wherein the data structure comprises a plurality of entries including:
a first entry comprising a first quantity value specifying how many ranges of values of the plurality of ranges of values ended before a first value of the attribute, and
a second entry comprising a second quantity value specifying how many ranges of values of the plurality of ranges of values ended before a second value of the attribute, wherein the second value is different from the first value, and the second quantity value is different from the first quantity value, wherein each respective entry of the plurality of entries corresponds to a respective range of values of the attribute starting at a start attribute value and ending at an end attribute value;

receive a database query comprising a predicate specifying a condition on a given value of the attribute;

compute, for the database query, a selectivity of filtering based on the metadata and the predicate, the selectivity computed based on:

determining that the given value of the attribute falls within a range of values of the attribute corresponding to a given entry of the plurality of entries, retrieving a given quantity value from the given entry, and computing, based on the given quantity value, a quantity of objects of the plurality of data objects expected to be filtered based on the metadata and the predicate;

determine a query plan for the database query based on the computed selectivity; and produce output data for the database query by performing operations in the database system according to the query plan.

2. The database system of claim 1, wherein the instructions are executable on the at least one processor to:

scan the plurality of ranges of values of the attribute in the metadata;

maintain counters that are updated as part of the scanning, wherein a first counter of the counters is updated responsive to each detection by the instructions of a range of values of the attribute that ended before the first value, and a second counter of the counters is updated responsive to each detection by the instructions of a range of values of the attribute that ended before the second value, wherein the first quantity value is specified by the first counter, and the second quantity value is specified by the second counter.

3. The database system of claim 1, wherein the different values of the attribute comprise attribute end values of the plurality of ranges of values of the attribute for the plurality of data objects, and wherein the first value is a first attribute end value representing an end of a first range of values of the attribute, and the second value is a second attribute end value representing an end of a second range of values of the attribute.

4. The database system of claim 1, wherein the computed selectivity is derived from dividing the quantity of objects expected to be filtered by a total quantity of the plurality of data objects, and wherein the instructions are executable on the at least one processor to:

determine the query plan by selecting the query plan from a plurality of query plans based on the computed selectivity.

5. The database system of claim 4, wherein the plurality of query plans comprise a first query plan in which the filtering based on the metadata and the predicate is performed before a database operation specified by the database query, and a second query plan in which the database operation specified by the database query is performed before the filtering based on the metadata and the predicate.

6. The database system of claim 5, wherein the instructions are executable on the at least one processor to:

select the first query plan responsive to the computed selectivity exceeding a threshold; and select the second query plan responsive to the computed selectivity not exceeding the threshold.

7. The database system of claim 1, wherein the data structure is a first data structure, and the instructions are executable to further:

generate a second data structure tracking quantities of ranges of values of the attribute that started before further corresponding different values of the attribute, wherein the second data structure comprises a plurality of entries including:

a third entry comprising a third quantity value specifying how many ranges of values of the plurality of ranges of values started before a third value of the attribute, and a fourth entry comprising a fourth quantity value specifying how many ranges of values of the plurality of ranges of values started before a fourth value of the attribute, wherein the fourth value is different from the third value, and the fourth quantity value is different from the third quantity value.

8. The database system of claim 7, wherein the predicate specifies that the attribute is equal to the given value of the attribute, wherein the computed quantity of objects expected to be filtered is based on a difference between a quantity value in an entry of the second data structure corresponding to the given value of the attribute and the given quantity value in the given entry of the first data structure.

9. The database system of claim 7, wherein the predicate specifies that the attribute is greater than the given value of the attribute and less than a further value of the attribute, wherein the computed quantity of objects expected to be filtered is based on a difference between a quantity value in an entry of the second data structure corresponding to the further value of the attribute and the given quantity value in the given entry of the first data structure.

10. The database system of claim 1, wherein the predicate specifies that the attribute is greater than the given value of the attribute, and the computed selectivity is based on a total quantity of the plurality of data objects and the computed quantity of objects expected to be filtered.

11. A non-transitory machine-readable storage medium comprising instructions that upon execution cause a database system to:

maintain metadata for a plurality of data objects, the metadata containing a plurality of ranges of values of an attribute for the plurality of data objects, wherein the plurality of ranges of values of the attribute comprise a respective range of values of the attribute for each corresponding data object of the plurality of data objects;

generate a data structure comprising a plurality of entries wherein each respective entry of the plurality of entries corresponds to a respective range of values of the attribute starting at a start attribute value and ending at an end attribute value, the plurality of entries including a first entry having a first quantity value specifying how many ranges of values of the plurality of ranges of values of the attribute started before a first value of the attribute, and a second entry including a second quantity value specifying how many ranges of values of the plurality of ranges of values of the attribute started before a second value of the attribute, wherein the second value is different from the first value, and the second quantity value is different from the first quantity value;

receive a database query comprising a predicate specifying a condition on a given value of the attribute;

compute, for the database query, a selectivity of filtering based on the metadata and the predicate, the selectivity computed based on:
 determining that the given value of the attribute falls within a range of values of the attribute corresponding to a given entry of the plurality of entries,
 retrieving a given quantity value from the given entry, and
 computing, based on the given quantity value, a quantity of objects of the plurality of data objects expected to be filtered based on the metadata and the predicate;

select a query plan from among a plurality of query plans for the database query based on the computed selectivity; and produce output data for the database query by performing operations in the database system according to the query plan.

12. The non-transitory machine-readable storage medium of claim 11, wherein the selectivity is computed based on:
 the first quantity value in the first entry of the data structure responsive to a determination that the given value of the attribute is within a range of values of the attribute corresponding to the first entry, or
 the second quantity value in the second entry of the data structure responsive to a determination that the given value of the attribute is within a range of values of the attribute corresponding to the second entry.

13. The non-transitory machine-readable storage medium of claim 11, wherein the computed selectivity is derived from dividing the quantity of objects expected to be filtered by a total quantity of the plurality of data objects.

14. The non-transitory machine-readable storage medium of claim 11, wherein the first value of the attribute is a first attribute start value of a first range of values of the attribute, and the second value of the attribute is a second attribute start value of a second range of values of the attribute.

15. The non-transitory machine-readable storage medium of claim 11, wherein the instructions upon execution cause the database system to:
 update the metadata responsive to an update of a data object of the plurality of data objects, wherein the updating of the metadata comprises changing a range of values corresponding to the data object that is updated.

16. A method of a database system comprising a hardware processor, comprising:
 maintaining metadata for a plurality of data objects, the metadata containing a plurality of ranges of values of an attribute for the plurality of data objects, wherein the plurality of ranges of values of the attribute comprise a respective range of values of the attribute for each corresponding data object of the plurality of data objects;

generating a first data structure comprising a plurality of entries tracking quantities of ranges of values of the attribute that started before corresponding different values of the attribute, wherein each respective entry of the plurality of entries corresponds to a respective range of values of the attribute starting at a start attribute value and ending at an end attribute value, and the plurality of entries comprise:
 a first entry comprising a first quantity value specifying how many ranges of values of the plurality of ranges of values started before a first value of the attribute, and
 a second entry comprising a second quantity value specifying how many ranges of values of the plurality of ranges of values started before a second value of the attribute, wherein the second value is different from the first value, and the second quantity value is different from the first quantity value;

generating a second data structure tracking quantities of ranges of values of the attribute that ended before corresponding different values of the attribute;

receiving a database query comprising a predicate specifying a condition on a given value of the attribute;

computing, for the database query, a selectivity of filtering based on the metadata and the predicate, the selectivity computed based on:
 determining that the given value of the attribute falls within a range of values of the attribute corresponding to the first entry of the first data structure,
 retrieving the first quantity value from the first entry of the first data structure,
 determining that the given value of the attribute falls within a range of values of the attribute corresponding to a given entry of the second data structure,
 retrieving a given quantity value from the given entry of the second data structure, and
 computing, based on the first quantity value and the given quantity value, a quantity of objects of the plurality of data objects expected to be filtered based on the metadata and the predicate;

selecting a query plan from among a plurality of query plans for the database query based on the computed selectivity; and producing output data for the database query by performing operations in the database system according to the query plan.

17. The method of claim 16, wherein the computed selectivity is based on dividing the computed quantity of object expected to be filtered by a total quantity of the plurality of data objects.

* * * * *